No. 858,011. PATENTED JUNE 25, 1907.
W. J. MOWBRAY.
METER.
APPLICATION FILED APR. 30, 1906.
2 SHEETS—SHEET 1.
Fig. 1,
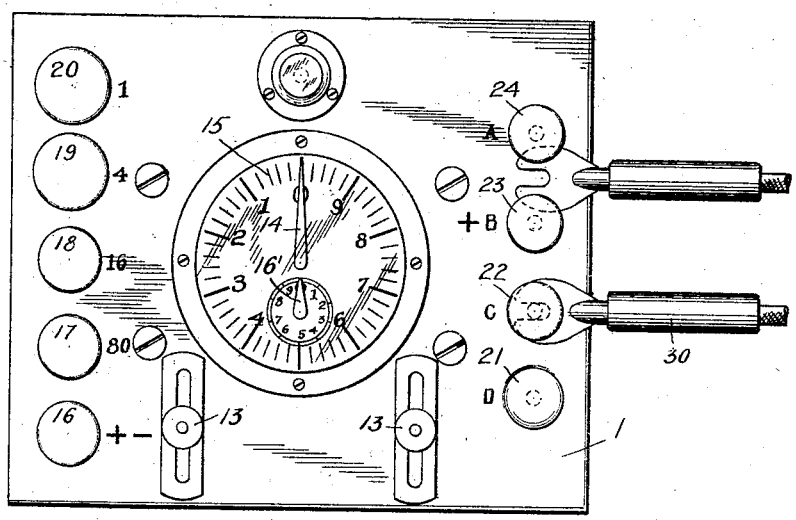
Fig. 2,
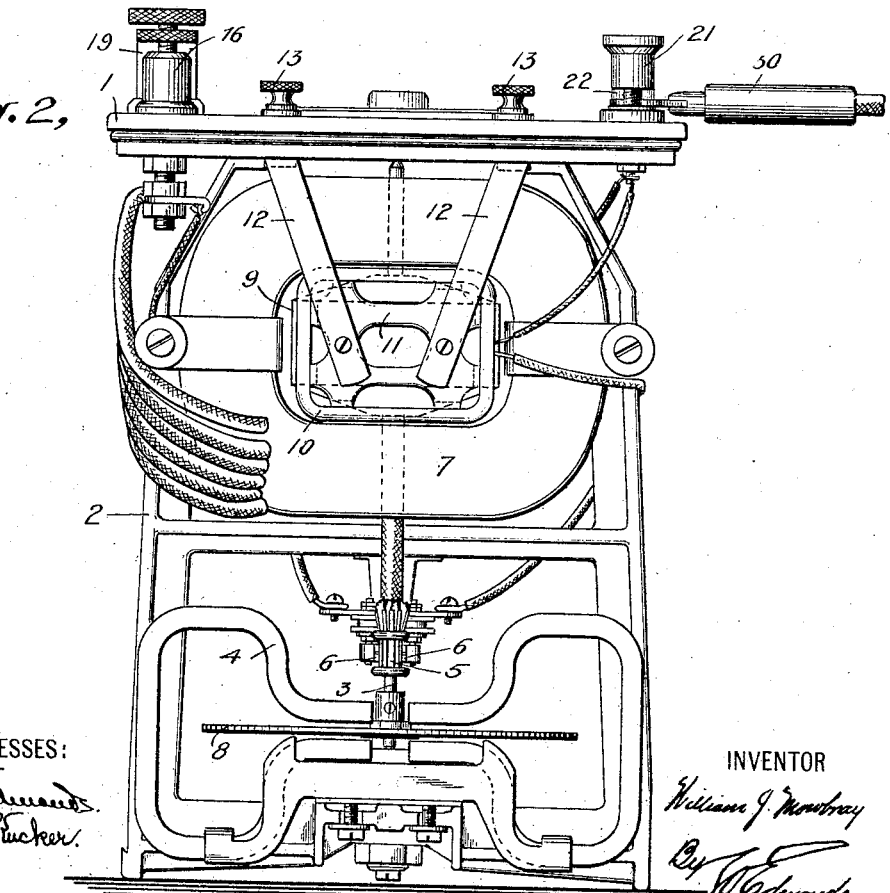
WITNESSES:
INVENTOR
William J. Mowbray
ATTORNEY No. 858,011.

PATENTED JUNE 25, 1907.

W. J. MOWBRAY.
METER.
APPLICATION FILED APR. 30, 1906.

2 SHEETS—SHEET 2.

WITNESSES:

INVENTOR
William J. Mowbray
BY
ATTORNEY

UNITED STATES PATENT OFFICE.

WILLIAM J. MOWBRAY, OF NEW YORK, N. Y.

METER.

No. 858,011.   Specification of Letters Patent.   Patented June 25, 1907.

Application filed April 30, 1906. Serial No. 314,477.

*To all whom it may concern:*

Be it known that I, WILLIAM J. MOWBRAY, a citizen of the United States, residing in the borough of Brooklyn, county of Kings, city and State of New York, have invented certain new and useful Improvements in Meters, of which the following is a specification.

This invention concerns electric meters and relates more particularly to meters of the type adapted for use in testing service meters installed on the premises of consumers of electric energy.

The object of the invention is to effect certain improvements in the construction, the electrical connections and the arrangement of the parts of meters of this type, to the end that they will be better adapted for use as testing instruments in connection with service meters varying widely in capacity, that they may be readily calibrated, that tests may be rapidly made and that more accurate results may be obtained.

Some of the features of my invention are of general application to meters of both the commutating and induction types, but as they will find their greatest utility in commutating meters, I will describe them in connection with a meter of that type with reference to the accompanying drawings, which show the preferred embodiment of my invention.

Figure 3:
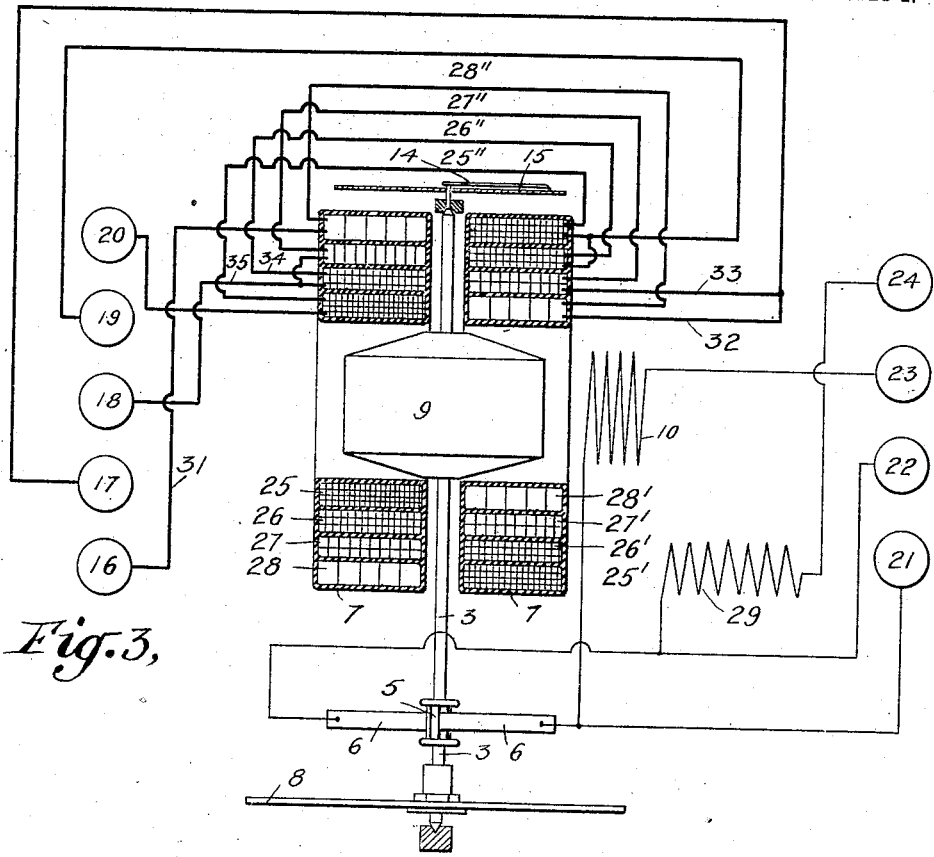
Figure 4:
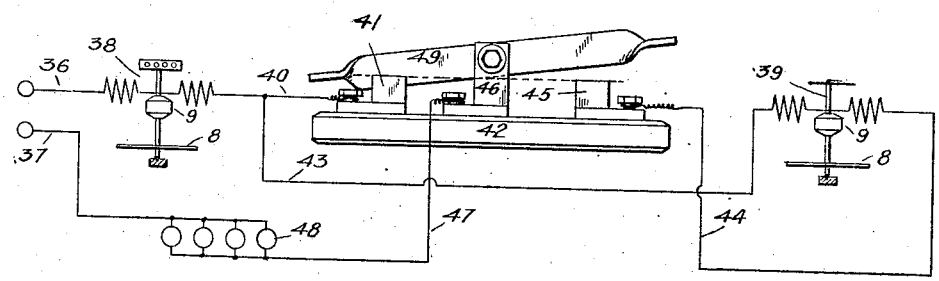

In these drawings Figure 1 is a top view of the meter having the casing removed, Fig. 2 is a front view of the same, Fig. 3 is a diagrammatic view showing the construction of the field coils and the electrical connections of the meter, and Fig. 4 is a diagrammatic view showing the manner of connecting the meter to a service meter in order to make a test.

Referring to these drawings, 1 indicates a supporting plate, preferably of insulating material, to the under side of which is secured a frame 2, which supports a step bearing for a vertical shaft 3, the upper end of which is journaled in and extends through a bearing in the plate 1. Mounted on shaft 3 is the armature 9 of the meter, the coils of which are connected to the segments of commutator 5 on which bear brushes 6, 6. Field coils 7, 7 are mounted on frame 2 in inductive relation to the armature 9, one on either side of shaft 3. The rotation of the moving element of the meter is retarded by a damping disk 8, secured on shaft 3 and one or more permanent magnets 4, 4 mounted on frame 2 with the flux of their fields intersecting the disk 8. In addition to the main field coils 7, 7 an auxiliary field coil 10 is mounted in inductive relation to the armature 9 and connected in series with the armature in the potential winding of the meter to compensate for friction. The meter as thus constructed is inclosed within a box, not shown in the drawings, of which the plate 1 forms the top.

In order that the position of the shunt field coil 10 with relation to the armature 9 may be adjusted without necessitating the removal of the instrument from its casing, I support the coil 10 upon a spider 11, to which are secured arms 12, 12 extending upward through slots in the plate 1. The upper ends of the arms 12 are threaded to receive thumb nuts 13 whereby, when the correct position of the coil 10 has been found, the coil may be secured in position. On the upper end of shaft 3 is an index 14 which, as the shaft rotates, moves over a graduated scale-plate 15, and if desired, a shaft carrying an auxiliary pointer 16' may be geared to shaft 3. On one side of the dial 15 are a plurality of binding posts 16, 17, 18, 19 and 20, by which the proper connections are made through the coils 7, 7 constituting the current winding of the instrument, and on the opposite side of dial 15 are binding posts 21, 22, 23 and 24 by which the proper connections are made through the armature 9, the shunt field coil 10 and a suitable resistance constituting the potential winding of the meter.

Referring to Fig. 3, I will now describe the construction of the field coils 7 and the electrical connections of the instrument. In testing service watt meters on consumer's premises, it has been considered necessary to make a test at substantially the full-load capacity of the service meter, and other tests at fractions of this full-load down to approximately one-tenth of the full-load capacity of the service meter, and in making all of these tests, the test meter must run at substantially its full-load capacity in order that the test meter will be free from errors resulting from running with the light torque developed by a relatively weak magnetic field. In order to obtain the full torque of the test-meter when it is running on currents corresponding to the full-load and to various fractions of the full-load current of the service meter, it has been usual to provide these test-meters with field coils consisting of a plurality of coil sections, one or more of which may be connected in circuit to produce the requisite torque. I adopt this expedient by constructing each of the field coils 7 of a plurality of coil sections, in the present case four in number, indicated at 25, 26, 27 and 28. The coil section 28 is designed for use with the largest current flowing through the current winding of the meter and hence consists of few turns of wire of large cross-section, the few turns being sufficient to give the requisite ampere-turns on account of the high amperage. The coil section 27 is of a larger number of turns of wire of smaller cross-section than coil section 28, as are also coil sections 26 and 25 with relation to the coil sections next adjacent thereto. The field coil 7 on the other side of shaft 3 is similar in all respects to the coil 7 just described, except that the four concentric coil sections are arranged in the inverse order with relation to the distance from the armature 9; for example, the coil section 28' which is of the same number of turns and the same wire as the coil section 28, is the innermost one of the four coil sections. The numbers of turns in the several coil sections of the two field coils are determined with respect to the loads at which the different coil sections are to be used, and if the field coil on the right of shaft 3 were exactly the same as that on the left, an error would be introduced due to the fact that as the two coil sections 28 would be at a greater distance from the armature 9 than the two coil sections 25, their inductive effect upon the armature 9 and that of the two coil sections 25, would not be in the relation of the ampere-turns of the two pairs of coils. By arranging the coil sections of the field coil 7 on the right of shaft 3 in inverse order with respect to the distance from the armature 9, it will be seen that the average distance of each pair of like coils from armature 9, is the same.

The coil sections 28 and 28' of the two field coils are connected in series by a wire 28", the coil sections 27 and 27' by a wire 27", the coil sections 26 and 26' by a wire 26" and the coil sections 25 and 25' by a wire 25", The binding post 16 is adapted to receive one of the leads to the test meter and the other of the two leads is connected to one of the posts 17, 18, 19 and 20; when connected to post 17, coils 28 and 28' will be included in circuit and constitute the current winding of the test meter; if connected to post 18, the coils 28 and 28' and 27 and 27' will be included in circuit and constitute the current winding; if connected to binding post 19 the coils 28 and 28', 27 and 27' and 26 and 26' will be included in circuit and if connected to post 20 all of the four coil sections of each of the two field coils will be connected in series and constitute the current winding of the meter.

The shunt field coil 10 is connected to the binding post 23 and to one of the brushes 6 by which current is carried to the armature 9. This brush is also connected to the binding post 21. The other brush is connected to the binding post 22 and also to a resistance 29 such as is usually employed in the potential winding of a watt-meter, and which is equal in ohmic value to the shunt field coil 10 and the armature 9. The other side of resistance 29 is connected to the binding post 24.

In order to obtain accurate results in the use of the test meter, it is of considerable importance that the parts of the potential circuit, including the shunt field coil and the armature, be of the temperature to which they would be raised by the passage of the current therethrough, so that their resistance will be stable, and in order to economize time in making the tests, it is usual to provide means whereby the parts in the potential circuit may be raised to this temperature more rapidly than they would be by merely connecting them in circuit in the ordinary manner. To facilitate this I provide on the ends of the leads for the potential circuit, connectors 30 (Figs. 1 and 2) having bifurcated metallic end pieces, such that they may be connected to any one of the binding posts 21, 22, 23 and 24, or may be secured under the thumb nuts of any two adjacent binding posts so as to make electrical connection to both of those posts. Thus, on a three wire system the potential leads from the two outer wires may be connected to the binding posts in the manner shown in Fig. 1. The current will enter at the binding post 22, flow through the armature 9 and the shunt field coil 10, and out at the binding post 23. Also, current will flow from binding post 22, through the resistance 29 to post 24 and out; in this case each half of the potential circuit (resistance 29 being equal to the sum of the resistances of coil 10 and armature 9) will be subjected to double the normal voltage and will be heated much more quickly than if connection were made to binding posts 23 and 24, in which case shunt field coil 10, the armature 9 and the resistance 29 would be connected in series across the lines. The extra post 21 is provided for heating when the instrument is used on a two-wire circuit. For such use, one of the connectors 30 would be connected to post 21 and the other to posts 22 and 23, and current would flow from post 21 through the shunt field coil 10 to post 23 and out, and from post 21 through the armature 9 to post 22, and out, and the armature and shunt field coil would be rapidly heated by the abnormal current passing therethrough. In this case, the resistance 29 is not heated as it is not used when working on a two-wire circuit for the reason that on the low voltage of a two-wire circuit it would cut down the current flowing in the potential winding too much to give the requisite torque.

When a test is to be made at the highest capacity of which the test meter is capable, the leads for the current winding of the test meter are connected as by connectors 30 to the binding posts 16 and 17 and current will therefore flow from post 16 by wire 31 to coil section 28, wire 28″, coil section 28′ and wire 32 to binding post 17 and the service meter will be tested in the manner hereinafter described. If then it is desired to make a test at a lower capacity, the connection to the binding post 17 is shifted to post 18. The current will then flow through the coil sections 28 and 28′ as before, to wire 32, then by wire 33 through the coil section 27′, wire 27″, coil section 27 and wires 34 and 35 to binding post 18. Tests at still lower capacities can be made by shifting the second connector to either post 19 or post 20, thereby connecting three or all of the pairs of coil sections in circuit. The coil sections of the two field coils are so constructed that the full-load torque of the test meter is developed when any one of these several connections for the series winding is employed, and the test meter is therefore running under the conditions conducive of greatest accuracy.

Fig. 4 shows the method of connecting the test meter and the switch which is used in connection therewith in circuit with a service meter. 36 and 37 indicate positive and negative mains on the consumer's premises and 38 indicates a consumer's integrating watt meter of the usual construction. The test meter, constructed as above described, is indicated at 39. From the service meter 38 a wire 40 extends to one of the clips 41 of a double throw-switch 42, and another wire 43 extends to one of the current-winding binding posts of the test meter 39. From the other side of this current winding a wire 44 extends to the clip 45 of the switch 42; the pivotal clip 46 of switch 42 is connected by a wire 47 to one side of a load 48, which may consist of lamps or other translating devices, the other side of which is connected to the negative main 37. The switch 42 is so constructed that when blade 49 thereof leaves the clip 41, it immediately enters the clip 45; in fact, there should be an instant when the blade is touching both clips 41 and 45 so as to avoid sparking at these clips. This is indicated in Fig. 4 by the dotted line, showing the position of the lower edge of blade 49 when it is in the mid position and which line, it will be seen, coincides with the tops of both clips 41 and 45. When the parts have been connected as shown in Fig. 4, the potential winding of the test meter properly heated and the desired sections of the two field coils of the test meter connected in circuit, the operator watches the moving element of the service meter, and when it is in a selected position, he quickly throws the blade of switch 42 to the position in which it enters clip 45. Before the blade was so thrown the current from main 36 flowed through the service meter 38, wire 40, clip 41, blade 49, clip 46, wire 47 load 48 and main 37, so that the current winding of the test meter was not energized.

When the blade 49 enters clip 45 and leaves clip 41, the current flows from main 36 through service meter 38, wire 43, test meter 39, wire 44, clip 45, blade 49, clip 46, wire 47, load 48 and main 37 and the moving element of the test meter begins to rotate. While the operator holds the switch blade 49 in this position, he counts the number of revolutions of the moving element of the service meter 38, and when this has been made a predetermined number of revolutions, he quickly throws the blade 49 back to its original position, that shown in Fig. 4. The moving element of the test meter comes to rest and the number of revolutions it has made during the period when current was flowing through its current winding, will be indicated by the index 14 and dial 15. If the products obtained by multiplying the number of revolutions made by the moving element of each meter by the constant of that meter are the same, the service meter is correct and if not the difference between those products forms a basis from which can be computed the amount of error, either fast or slow, of the service meter. Several tests of the service meter are made in this way, one at approximately the full-load capacity of the service meter, and others at fractions of this capacity, and the proper adjustments are made to make the service meter register accurately. In all of these tests, however, the full-load torque of the test meter is obtained as above described, so that no error is introduced into its readings, due to operation with low torque as in the case of the service meter.

What I claim as new and desire to secure by Letters Patent is:

1. In a meter, a frame, a shaft rotatable in bearings carried by the frame, a commutator on said shaft, an armature mounted on said shaft and having its coils connected to the segments of the commutator, and a plurality of field coil sections mounted in inductive relation to the armature but at varying distances therefrom, said coil sections being so arranged as to compensate for differences in their inductive effect upon the armature due to the varying distances between them and the armature, substantially as described.

2. In a meter, a rotatable armature, two field coils mounted in inductive relation thereto, each of said coils comprising a plurality of coil sections arranged at progressively increased distances from said armature, and means connecting each section of one coil with a section of the other coil such that the average distance from the armature of all the pairs of coil sections so connected is the same, substantially as described.

3. In a meter, a rotatable armature, a field coil mounted in inductive relation thereto and having a plurality of coil sections each differing from the others in the number of turns and in the distance from the armature, a second coil mounted in inductive relation to the armature and having similar coil sections arranged inversely with relation to the distance from the armature, and connections between the similar coil sections, substantially as described.

4. In a meter, a rotatable armature, two field coils mounted in inductive relation thereto each consisting of a plurality of coil sections, binding posts, and means connecting in series between said posts a coil section of one coil and a coil section of the other coil at a distance from said armature different from said first-named coil section, substantially as described.

5. In a meter, a rotatable armature, two field coils mounted in inductive relation thereto each consisting of a plurality of coil sections, binding posts, and means connecting in series between said posts one or more pairs of said coil sections, each pair comprising a coil section of each coil one mounted at a distance from the armature different from the other, substantially as described.

6. In a meter, a rotatable armature, two field coils mounted in inductive relation to said armature and each comprising a plurality of coil sections, a plurality of binding posts, and connections between said posts and said coil sections such that one or more pairs of said coil sections are connected in series between a pair of said posts, each pair comprising a coil section of each coil one mounted at a distance from the armature different from the other, substantially as described.

7. In a meter, a rotatable armature, a field coil mounted in inductive relation thereto, a shunt field coil also mounted in inductive relation to said armature, a resistance, binding posts to which said armature, shunt field coil and resistance are connected, and a connector for a wire arranged for connection with any one or any two adjacent binding posts, substantially as described.

8. In a meter, a support, a frame suspended from one side thereof, a shaft mounted for rotation in said frame perpendicular to said support, an armature carried thereby, a field coil mounted in inductive relation to said armature, a shunt field coil also mounted in inductive relation to said armature, and means permitting adjustment of said shunt field coil from the side of said support opposite to that to which said frame is secured, substantially as described.

9. In a meter, a support having a slot therein, a frame suspended from one side thereof, a shaft mounted for rotation in said frame perpendicular to said support, an armature carried by said shaft, a field coil mounted in inductive relation to said armature, a shunt field coil also mounted in inductive relation to said armature, and a supporting device for said shunt field coil extending through the slot in said support to permit adjustment of said shunt field coil from the side of said support opposite to that to which said frame is secured, substantially as described.

This specification signed and witnessed this 9th day of April, 1906.

WM. J. MOWBRAY.

Witnesses:
   I. McIntosh,
   D. S. Edmonds.